United States Patent
Yarbrough et al.

(10) Patent No.: US 6,663,160 B2
(45) Date of Patent: Dec. 16, 2003

(54) CARGO BED COVER

(75) Inventors: Randy D. Yarbrough, 533 Baker Dr., Hurst, TX (US) 76054; Charles W. Kemp, 2300 Woodbine St., Arlington, TX (US) 76012

(73) Assignees: Randy D. Yarbrough, Hurst, TX (US); Charles W. Kemp, Arlington, TX (US); James Hurst, Arlington, TX (US)

( * ) Notice: Subject to any disclaimer, the term of this patent is extended or adjusted under 35 U.S.C. 154(b) by 0 days.

(21) Appl. No.: 10/238,553

(22) Filed: Sep. 10, 2002

(65) Prior Publication Data
US 2003/0047958 A1 Mar. 13, 2003

Related U.S. Application Data
(60) Provisional application No. 60/318,531, filed on Sep. 10, 2001.

(51) Int. Cl.[7] .................................................. B60P 7/02
(52) U.S. Cl. .......................... 296/100.06; 296/100.01; 296/100.02; 296/100.03; 296/100.05; 296/100.08; 296/100.1; 296/26.01; 296/26.04; 296/26.05; 296/26.07
(58) Field of Search ....................... 296/100.01, 100.02, 296/100.03, 100.05, 100.06, 100.08, 100.09, 100.1, 26.04, 26.05, 26.06, 26.07, 37.6, 26.01

(56) References Cited

U.S. PATENT DOCUMENTS

| | | | | |
|---|---|---|---|---|
| 3,420,570 A | * | 1/1969 | Kunz ..................... | 296/100.06 |
| 3,858,744 A | * | 1/1975 | Garvert ................... | 296/26.07 |
| 4,261,611 A | * | 4/1981 | Barry et al. ............. | 296/100.1 |
| 4,284,303 A | | 8/1981 | Hather | |
| 4,531,775 A | * | 7/1985 | Beals ..................... | 296/100.06 |
| 4,832,394 A | * | 5/1989 | Macomber ............. | 296/100.06 |
| 5,183,309 A | | 2/1993 | Jordan | |
| 5,203,364 A | * | 4/1993 | Koole .................... | 296/100.03 |
| 5,366,266 A | * | 11/1994 | Harbison ............... | 296/100.02 |
| 5,934,735 A | * | 8/1999 | Wheatley .............. | 296/100.01 |
| 6,076,881 A | * | 6/2000 | Tucker .................. | 296/100.07 |
| 6,086,134 A | * | 7/2000 | Cravens et al. ........ | 296/100.06 |
| 6,227,602 B1 | * | 5/2001 | Bogard .................. | 296/100.06 |
| 6,254,169 B1 | * | 7/2001 | Arthur ................... | 296/100.06 |
| 6,338,520 B2 | * | 1/2002 | Rusu et al. ............ | 296/100.07 |
| 6,382,699 B1 | * | 5/2002 | Hanson ................. | 296/100.09 |
| 6,394,532 B1 | * | 5/2002 | Dence ................... | 296/100.06 |
| 6,402,223 B2 | * | 6/2002 | Ser et al. ............... | 296/100.08 |
| 6,402,224 B1 | * | 6/2002 | Monaco et al. ........ | 296/100.06 |
| 6,428,079 B1 | * | 8/2002 | Van Dyke ............. | 296/100.06 |
| 6,435,594 B1 | * | 8/2002 | Ekonen et al. ......... | 296/100.09 |

OTHER PUBLICATIONS

*Snowbear*, SnowBear Corporation, Versacap Features, 1996–2001, pp. 1 and *Snowbear*, SnowBear Corporation, Versacap Specifications Owners Manual, 1996–2001, pp. 1–12.

*SplitTops*, a division of Flex–Tops, L.L.C., Product Information & Comparison, p. 1.

* cited by examiner

*Primary Examiner*—D. Glenn Dayoan
*Assistant Examiner*—Lori L Coletta
(74) *Attorney, Agent, or Firm*—Bracewell & Patterson, L.L.P.

(57) ABSTRACT

A cargo bed cover is provided for enclosing the cargo bed of a vehicle. A generally planar outer frame is mounted to the cargo bed, and two generally planar inner frames are connected with hinges to the outer frame for pivoting relative to the outer frame. The inner frames are moveable between a position with the inner frame generally parallel to the outer frame and a position with the inner frame at an angle relative to the outer frame. A generally planar cover panel is connected with a hinge to each inner frame for pivoting relative to the inner frame between a position with the cover panel is generally parallel to the inner frame and a position with the cover panel is at an angle relative to the inner frame. Each cover panel is slidingly connected to the inner frame for sliding relative to the inner frame.

20 Claims, 7 Drawing Sheets

CARGO BED COVER

CROSS-REFERENCE TO RELATED APPLICATION

Benefit is herein claimed of the filing date under 35 USC §119 and/or §120 and CFR 1.78 to U.S. Provisional Patent Application Serial No. 60/318,531, filed on Sep. 10, 2001, entitled "Cargo Bed Cover."

BACKGROUND OF THE INVENTION

1. Field of the Invention

This invention generally relates to cargo bed covers and particularly relates to covers having double-hinged cover panels, allowing multiple methods of access to the cargo bed.

2. Description of the Related Art

Cargo bed covers, or "caps," have been used in the past to cover the open tops of cargo areas in vehicles, for example, the beds of pickups and trailers having open beds. The covers enclose the cargo bed for providing a dry, secure storage area.

Typically, these covers have a single-piece cover panel that is hinged along a forward edge or along a lateral edge. The hinge allows the user to access the interior of the cargo area by pivoting the edge of the cover panel opposite the hinge upward relative to the bed. However, since the single-piece design often has a limited range of motion, the usefulness of the bed for transport of items taller than the depth of the bed is compromised. The cover panel may be removed prior to transport of the tall items, but this adds additional time and effort to the task.

Two-piece bed covers have also been provided, in which a hinge is located between two cover panels, the hinge being oriented to have a lateral or longitudinal axis. In applications having a hinge with a lateral axis, the rear edge of a front cover panel is hinged near the front edge of a rear cover panel, the panels being opened by pivoting one or both of the panels about the hinge. With a longitudinal hinge, left and right cover panels are hinged near each other at their inner edges, which are typically located near the longitudinal centerline of the bed. This allows either cover panel to be opened by pivoting the outer edge of a panel upwards. As with the single-piece covers, the ability to transport tall items is reduced when the cover is installed.

A two-piece cover, available under the trademark Versacap from SnowBear Corporation of Canada, attempts to solve the limitations of the prior art. The Versacap cover provides a set of posts that extend into the bed and attach to the floor of the bed, reducing the available floor area in the bed. Two inner frames are each pivotally connected to the posts at their outer edges, allowing the inner frames to be pivoted relative to the posts by lifting the inner edges of the inner frames A cover panel is pivotally connected to each inner frame at their inner edges, allowing the cover panels to be pivoted relative to the inner frames by lifting the outer edges of the cover panels. A user may access the cargo area in the bed by opening either cover panel or by opening one or both inner frames. Opening the inner frames creates an open area in the central portion of the bed for transporting tall items, though the inner frames are not capable of moving to a completely vertical position. However, the cover is limited to the orientations described, and the reduction of floor area limits the size or number of items that can be placed in the bed.

There is a need for an improved cargo bed cover that provides for multiple orientations of the cover panels. In addition, there is a need for such a cover that attaches to the upper portion of the bed, such as to the stake pockets in the sidewalls of the bed, providing for an easy installation, and that does not reduce the available floor area of the bed.

SUMMARY OF THE INVENTION

A cargo bed cover is provided for enclosing the cargo bed of a vehicle, such as a pickup truck or a trailer. A generally planar outer frame is mounted to an upper portion of the cargo bed, and two generally planar inner frames are connected with hinges or similar connectors to the outer frame for pivoting relative to the outer frame. The inner frames are moveable between a closed position, in which the inner frame is generally parallel to the outer frame, and an open position, in which the inner frame is at an angle relative to the outer frame. A generally planar cover panel is connected with a hinge to each inner frame for pivoting relative to the inner frame between a closed position, in which the cover panel is generally parallel to the inner frame, and an open position, in which the cover panel is at an angle relative to the inner frame. Each cover panel is slidingly connected to the inner frame for sliding relative to the inner frame. When the cover panels and inner frames are in the closed positions, the cover encloses the cargo bed.

The combination of the pivoting and sliding connections to the inner frames allows the cover panels to be positioned in multiple positions. For example, the inner frames may be left in the closed positions, and the cover panel may be moved laterally outward, forming a horizontal surface extending beyond the outer sidewall of the bed. Also, when the inner frames are in the open position, the cover panels may be rotated to their open position, then moved inwardly to meet each other above the center of the bed, forming a raised cover over the bed.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

DETAILED DESCRIPTION OF THE INVENTION

FIGS. 1 through 10 illustrate the preferred embodiment of a cargo bed cover 11, cover 11 being shown installed on a cargo bed 13 of a vehicle. Cover 11 is used to selectively enclose the interior of bed 13, providing protection from ambient conditions and security for items placed within bed 13. The vehicle may be of any type having a cargo bed, for example, a pickup truck or a trailer. Bed 13 will typically be rectangular, but bed 13 may be square. Cover panels 15, 17 are mounted to a double frame system having hinges at outer and inner portions for allowing multiple methods of access to the interior of bed 13.

Referring to the figures, a generally planar outer frame 19 comprises a forward rail 21 and two outer side rails 23, 25. Outer frame 19 is U-shaped, opening toward the rear of bed 13, and is preferably installed on the upper portion of bed 13. Four rubber inserts 27 (FIG. 3) depend from plates 29 attached to rails 23, 25 of outer frame 19, inserts 27 being used for locating cover 11 on bed 13. Inserts 27 are preferably sized for insertion into rectangular stake pockets (not shown), which are commonly formed near the corners of cargo beds for receiving upright stakes used to secure cargo.

Figure 2:
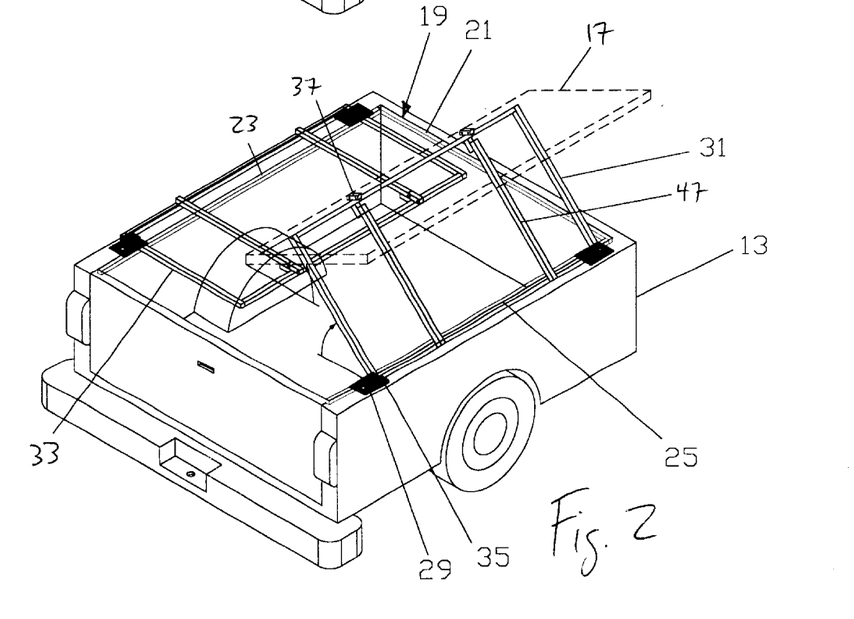
FIG. 2 is a perspective view of the cargo bed of FIG. 1 with the cover panels removed.
Figure 3:
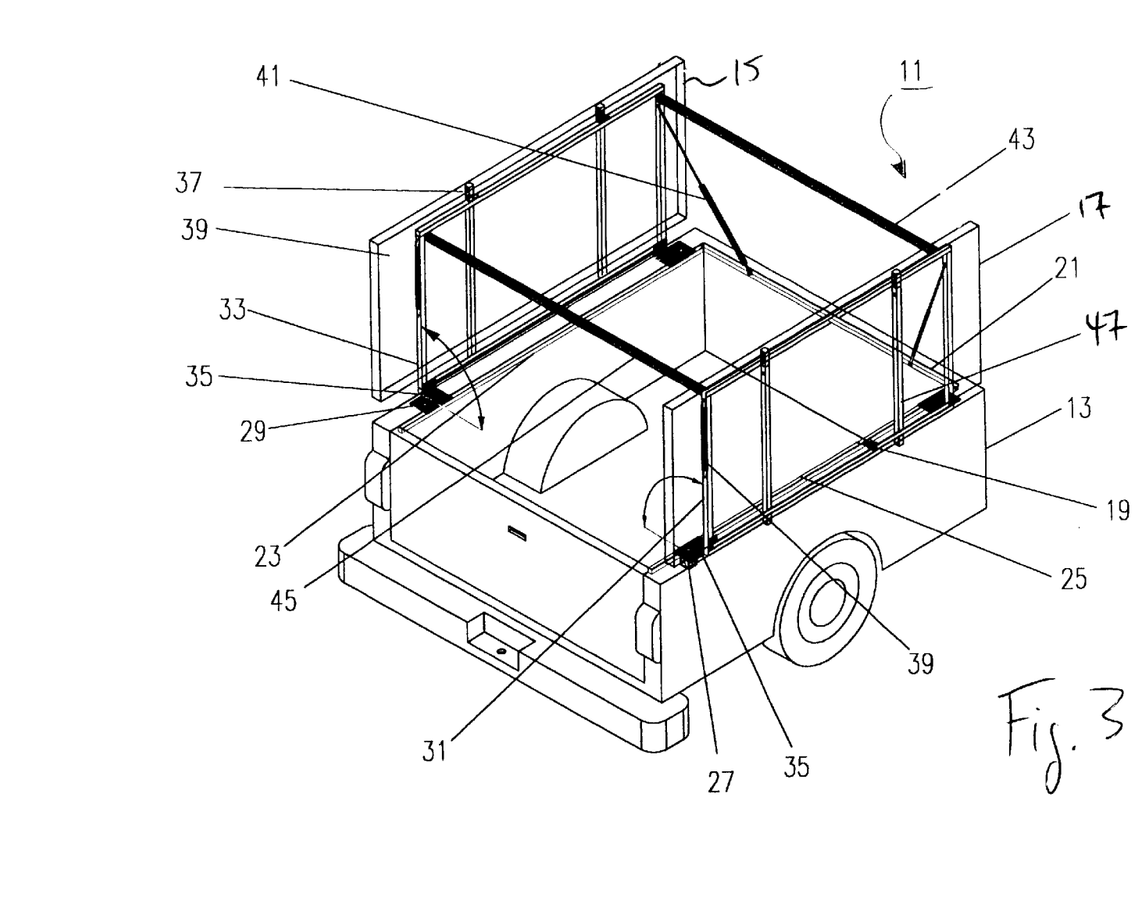
FIG. 3 is a perspective view of the cargo bed cover of FIG. 1 showing the panels in an alternate orientation.

Two generally planar inner frames 31, 33 are formed as rectangular sections and are pivotally connected to outer frame 19 by hinges 35 near each outer corner of inner frames 31, 33. Hinges 35 allow inner frames 31, 33 to pivot relative to outer frame 19, the inner edge of each inner frame 31, 33 pivoting upward. This pivoting is shown in FIG. 2, as inner frame 31 is partially raised from its closed position, whereas inner frame 33 remains in the closed position. FIG. 3 shows frames 31, 33 in their fully open, upright positions.

Figure 4:
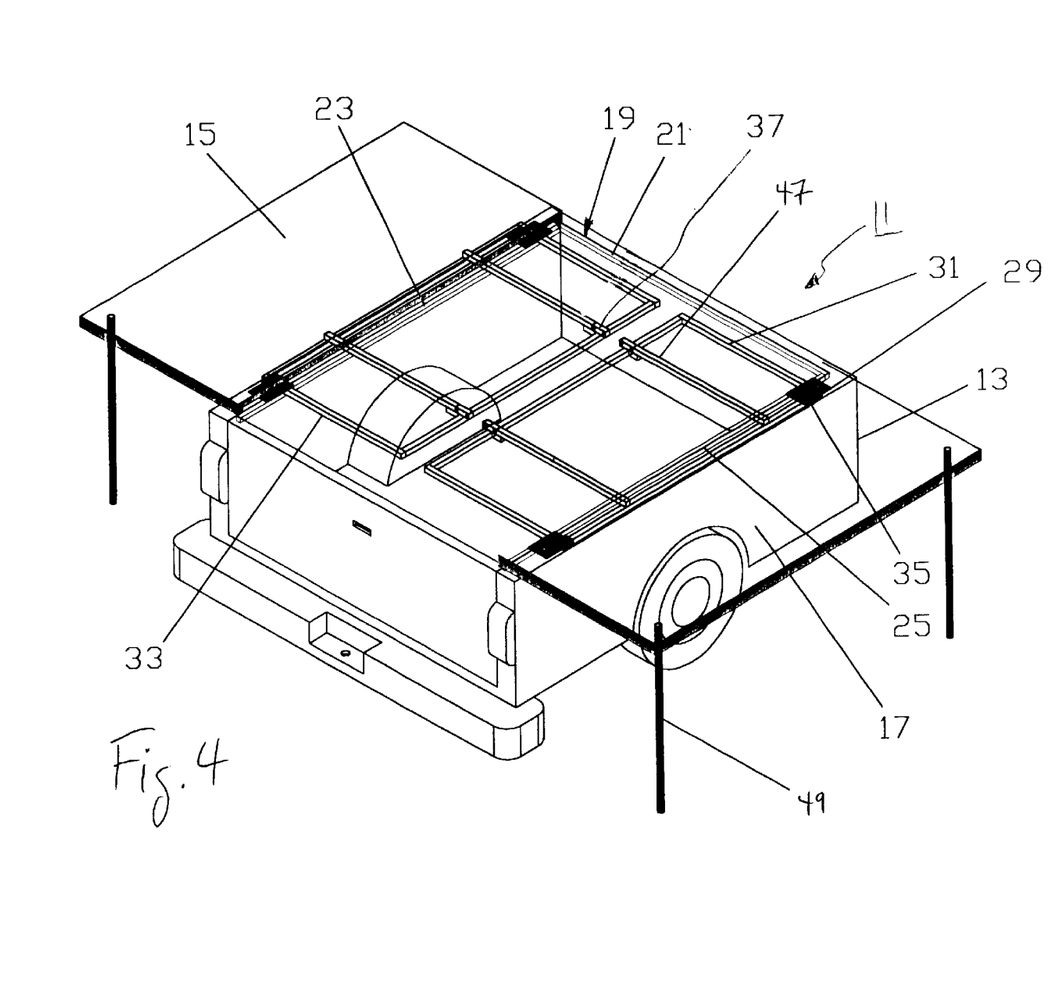
FIG. 4 is a perspective view of the cargo bed cover of FIG. 1 showing the panels in a second alternate orientation.
Figure 6:
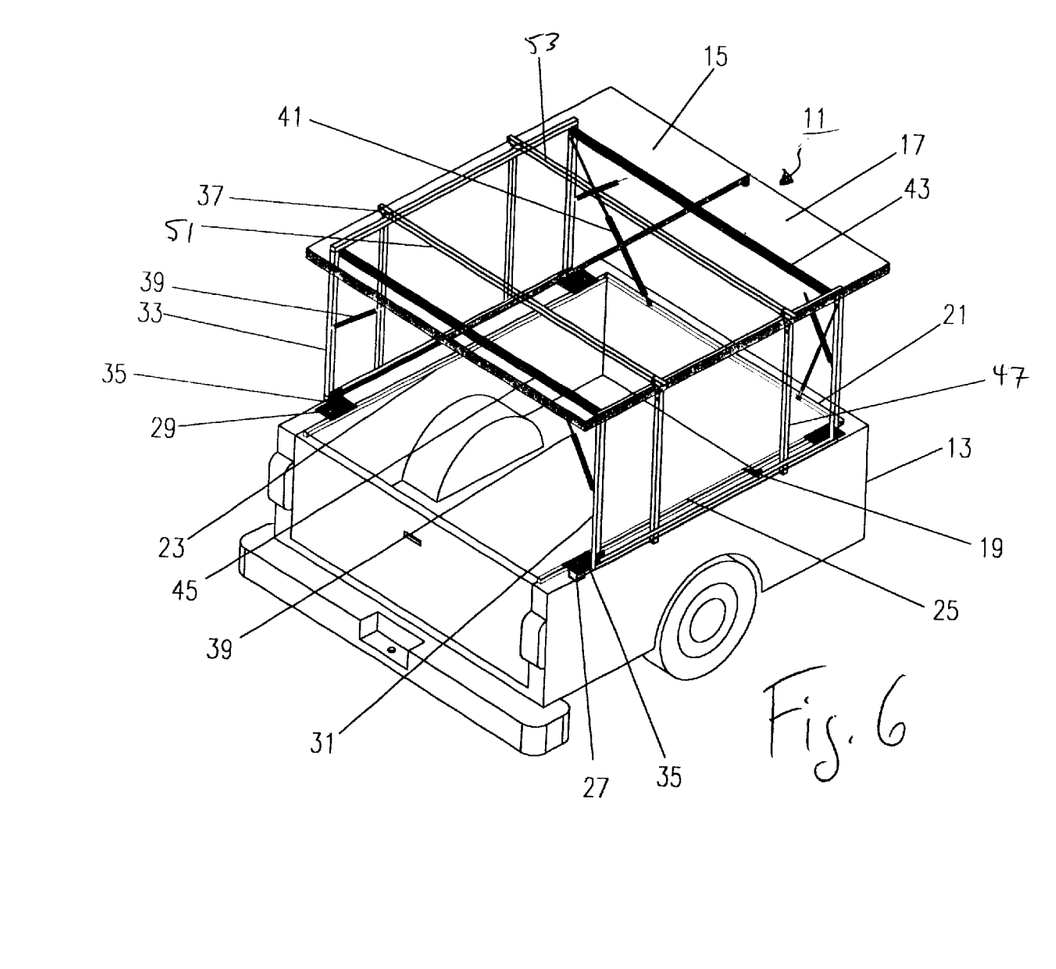
FIG. 6 is a perspective view of the cargo bed cover of FIG. 1 showing the panels in a fourth alternate orientation.
Figure 10:
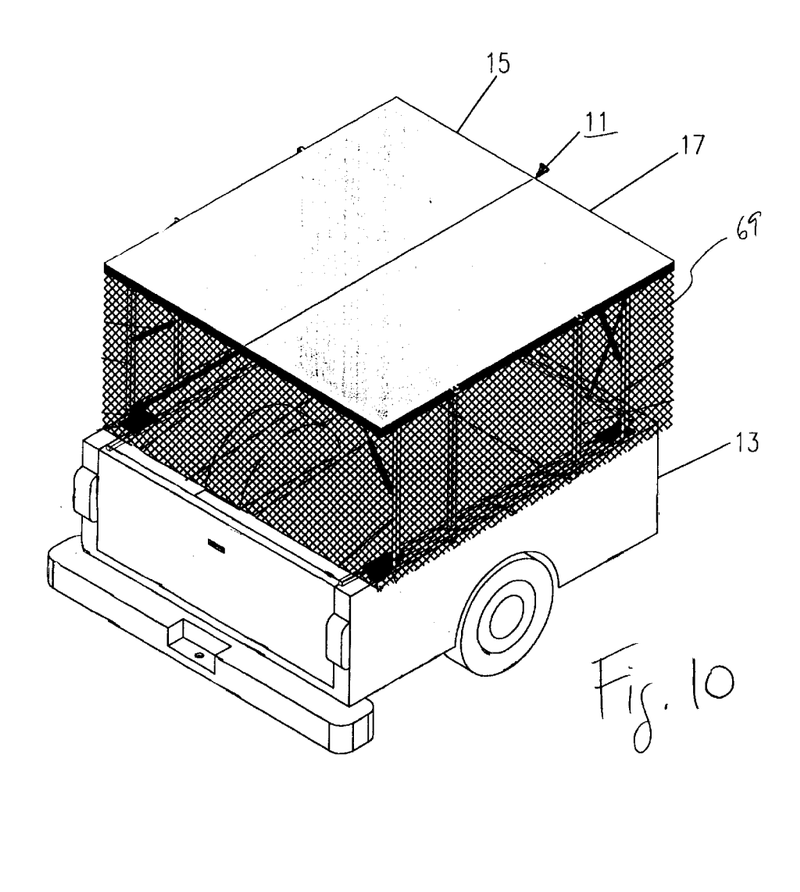
FIG. 10 is a perspective view of the cargo bed cover of FIG. 1 showing the panels in the position of FIG. 6 and having a screen enclosing the cargo area in accordance with the present invention.

Panels 15, 17 are pivotally attached to frames 31, 33 by hinges 37, allowing panels 15, 17 to pivot relative to inner frames 31, 33. In FIG. 2, panel 15 is removed for ease of illustration, whereas panel 17 is shown in phantom. Panel 17 is shown in FIG. 2 as partially raised from its closed position on inner frame 31. Panels 15, 17 are attached to inner frames 31, 33 in a manner that also allows panels 15, 17 to slide laterally relative to inner frames 31, 33, as shown in FIGS. 4, 6, and 10.

Lifts 39, 41, preferably gas-filled struts, are provided to assist the user in lifting panels 15, 17 or frames 31, 33 to their open positions. Lifts 39 are preferably located at the forward and rearward ends of each inner frame 31, 33 and connect each inner frame 31, 33 to its corresponding panel 15, 17. Likewise, lifts 41 are preferably located near the forward end of outer frame 19 and connect inner frames 31, 33 to outer frame 19.

Figure 1:
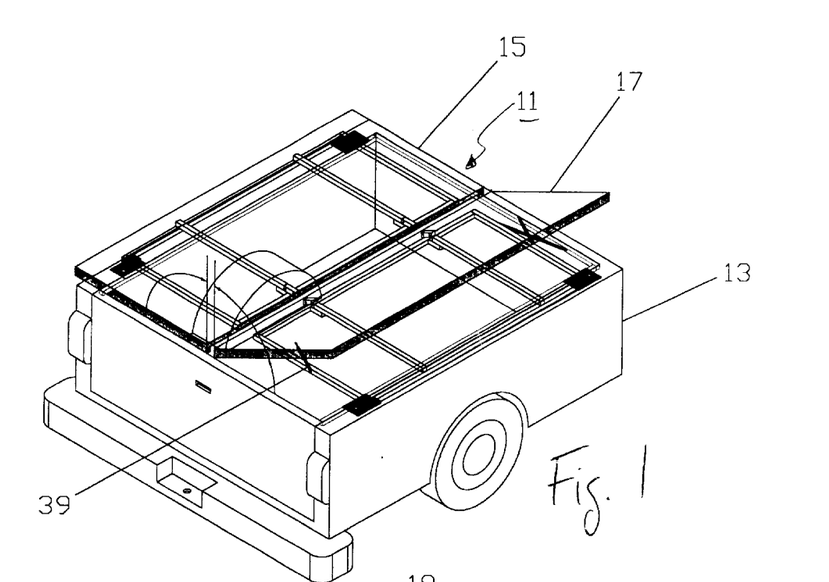
FIG. 1 is a perspective view of an installed cargo bed cover in accordance with the present invention.

The double-frame system allows for two methods of hinged access to the interior of bed 13. The first method is to raise the outer edge of one or both of panels 15, 17, with panels 15, 17 pivoting on hinges 37 and inner frames 31, 33 remaining in the closed position relative to outer frame 19. This method is shown in FIG. 1. Access to the interior of bed 13 is provided along the length of the lateral sides of bed 13 and at the forward and rearward ends of bed 13.

The second method of hinged access is shown in FIG. 3. The inner edge of one or both of inner frames 31, 33 is raised so that frames 31, 33 pivot on hinges 35, panels 15, 17 remaining in the closed position on inner frames 31, 33. Frames 31, 33 are capable of being moved to an upright position, wherein frames 31, 33 are approximately perpendicular to outer frame 19. Using this method provides access to the interior of bed 13 through the central portion of bed 13. However, when panels 15, 17 are in the closed position, access from the lateral sides of bed 13 is blocked. Panels 15, 17 and inner frames 31, 33 are held upright by lifts 41 and are preferably connected at the inner edges of inner frames 31, 33 by support 43 at the forward portion and by support 45 at the rear portion. Supports 43, 45 connect at their outer ends to inner frames 31, 33, and supports 43, 45 are preferably removably carried in panels 15, 17 for ready access. Advantages to this method of access include full access to the interior of bed 13 from the rear of bed 13 when the tailgate of bed 13 is lowered and the ability to transport items having a height greater than the interior depth of bed 13 without the need to remove cover 11. Another advantage is that panels 15, 17 form closed sides for partially enclosing cargo in bed 13.

In addition to the hinged access, the user may slide one or both of panels 15, 17 outward relative to frames 31, 33 to provide access to the interior of bed 13 and to form a generally horizontal work surface. Panels 15, 17 slide horizontally and laterally outward on slide rails 47, which are located within the perimeter of inner frames 31, 33. Panels 15, 17 are shown in FIG. 4 as having been moved to their outer sliding positions, hinges 37 allowing for the ability to slide panels 15, 17. Upper ends of table supports 49 can be attached to the lower surface of panels 15, 17, lower ends of supports 49 resting against a support surface below panels 15, 17 to support panels 15, 17 in a generally horizontal position. Supports 49 are also preferably stored in panels 15, 17.

Figure 5:
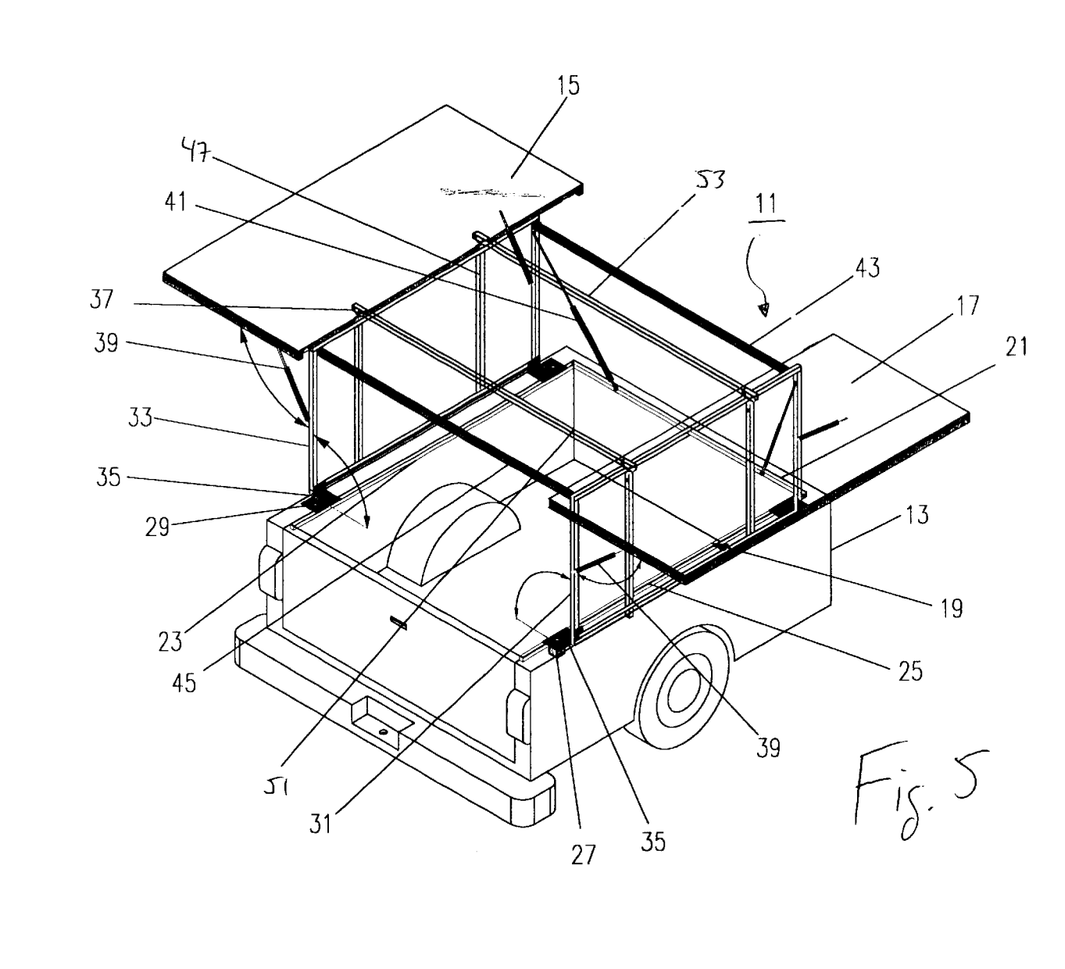
FIG. 5 is a perspective view of the cargo bed cover of FIG. 1 showing the panels in a third alternate orientation.

As shown in FIG. 5, panels 15, 17 may be pivoted on hinges 37 to move panels 15, 17 into a generally horizontal position when inner frames 31, 33 are in the upright position. The positioning of panels 15, 17 shown in FIG. 5 provides for a covered or shaded area on the exterior of bed 13. Lifts 39 support panels 15, 17 in the horizontal position, which corresponds to the open position shown in FIG. 1.

Additionally, panels 15, 17 may slide inward on side rails 51, 53, which are attached to the inner portions of inner frames 31, 33 above bed 13. The positioning of panels 15, 17 in FIG. 6 provides for a covered area within bed 13 by connecting the inner edges of panels 15, 17. Panels 15, 17 may slide inward on hinges 37, placing the outer edge of panels 15, 17 near inner edge of inner frames 31, 33. The inner edges of panels 15, 17 are then connected to form the cover. Alternatively, rails 51, 53 may be attached to the forward and rearward frame rails of inner frames 31, 33.

Figure 7:
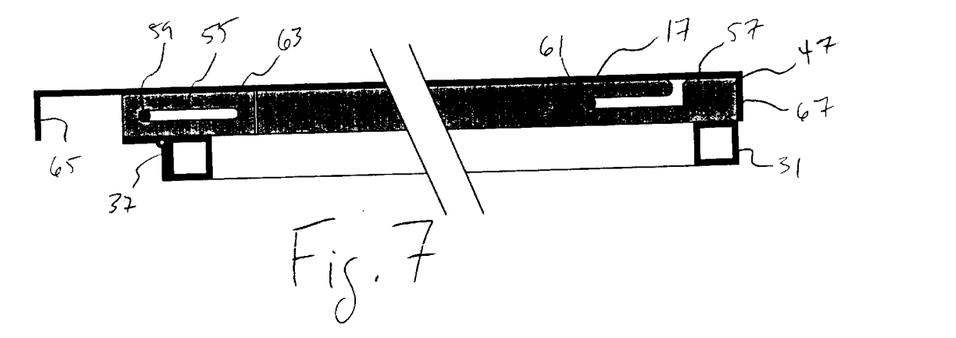
FIG. 7 is an end view of the cargo bed cover of FIG. 1 showing detail of the panel retention system in a closed position and in accordance with the present invention.
Figure 8:
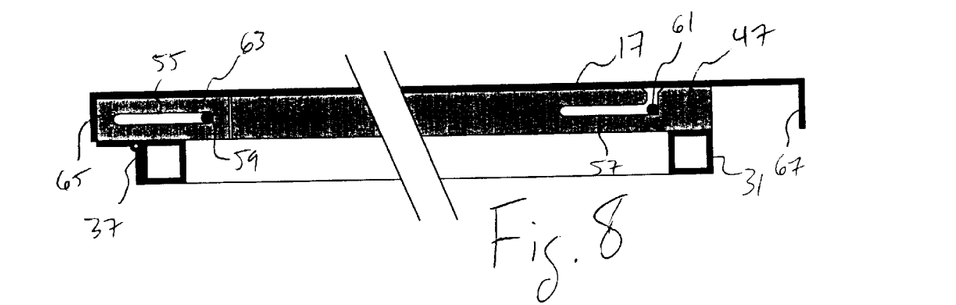
FIG. 8 is an end view of the cargo bed cover of FIG. 1 showing detail of the panel retention system in a second position and prior to opening.
Figure 9:
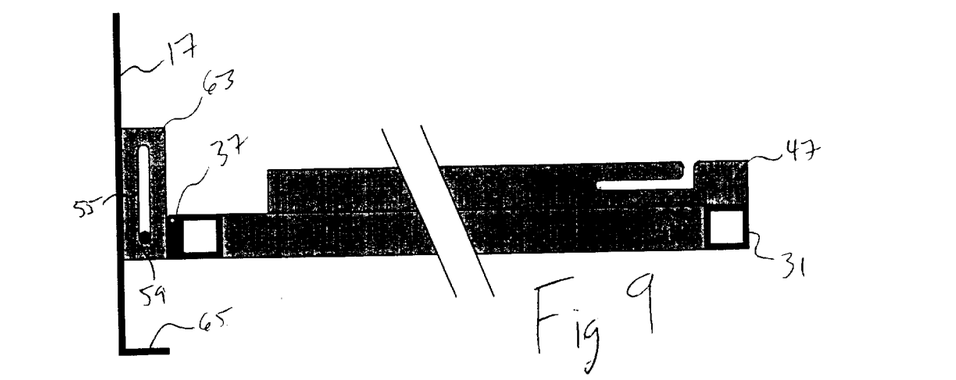
FIG. 9 is an end view of the cargo bed cover of FIG. 1 showing detail of the panel retention system in a third position and after opening.

FIGS. 7 through 9 show the details and operation of one embodiment of a latch mechanism for cover 11 used to secure panels 15, 17 to inner frames 31, 33. Panels 15, 17 are attached to each slide rail 47 at inner slot 55 and outer slot 57 by pins 59 and 61, respectively. Inner slot 55 is a closed, horizontal slot and is located in hinge rail 63, which is attached to inner frame 31 by hinge 37. Outer slot 57 has a lower, horizontal section and a vertical section that is open at the top. Outer slot 57 is located in the outer portion of slide rail 47.

In FIG. 7, panel 17 is shown in the closed position. The lower surface of panel 17 rests against the upper surface of slide rail 47, slide rail 47 being attached to the upper surfaces of the inner and outer frame rails of inner frame 31. Panels 15, 17 have vertical inner skirts 65 for sealing panels 15, 17 to each other at the center of the cargo area and vertical outer skirts 67 for sealing panels 15, 17 to inner frames 31, 33. Skirts 65, 67 may be the inner vertical surfaces of additional frame rails attached to the lower surface of panels 15, 17 or may be formed as integral portions of panels 15, 17. In the closed position, inner skirts 65 of panels 15, 17 are near each other above the center of bed 13, a means (not shown) for sealing panels 15, 17 to each other preferably being located near or between inner skirts 65. Pin 59 is located in the inner end of inner slot 55, and pin 61 is located at the inner end of the lower section of outer slot 57. A detent, or other means of retention, is used to maintain panel 17 in this position until panel 17 is to be opened. Though not shown, inner skirts 65 may be formed to be tongue-and-groove connectors or may have pins and corresponding holes for securing panels 15, 17 to each other.

To disengage the connectors used to secure panels 15, 17 to each other and avoid interference between panels 15, 17 and inner skirts 65 when opening panels on hinges 37, the user slides panels 15, 17 outward (to the right) prior to opening. FIG. 8 shows panel 17 in a position just before opening, having been moved outward. Pins 59, 61 are moved to the outer ends of slots 55 and 57, pin 61 being positioned to move upward in the vertical section of slot 57 for allowing panel 17 to open using hinge 37. In FIG. 8, panel 17 has been rotated to the open position on hinge 37, hinge rail 63 rotating with panel 17. An additional detent, or other means of retention, is used to maintain pin 59 in the outward position of slot 55 as panel 17 is rotated to the open position. To close panels 15, 17, the procedure described for opening panels 15, 17 is reversed, with pin 61 entering the vertical section of slot 57 and panels 15, 17 being moved inward toward each other.

Though not shown in the drawings, panels 15, 17 may have latches for selectively determining which portions of cover 11 move relative to the other portions of cover 11. The latches would prevent relative motion between the components connected by the latches. Latches may be located along the edges of panels 15, 17 or may be located at the corners. Also, latches may be located on inner frames 31, 33 or on outer frame 19 to accomplish the same tasks. For example, a latch may be located on panels 15, 17 for securing panels 15, 17 to inner frames 31, 33 or for securing panels 15, 17 to each other. Likewise, latches may be located on inner frames 31, 33 for securing inner frames 31, 33 to outer frame 19.

Additional features may be incorporated into panels 15, 17. FIG. 10 shows a cover 11 positioned in the arrangement of FIG. 6 and having screens 69 attached to panels 15, 17, screens 69 extending downward to the upper portions of bed 13 to enclose the cargo area. Other possible features not shown in the figures include, for example, lighting fixtures installed in panels 15, 17 for producing light to be used under panels 15, 17. This is helpful in illuminating cargo in bed 13 when panels are in the positions in FIGS. 1, 3, and 6, or for directing light to a work area outside of bed 13 when panels 15, 17 are in the position shown in FIG. 5. Panels 15, 17 may also be modified to accept fishing tackle or other long items. Inner frames 31, 33 may be adapted to incorporate full- or partial-length tool trays, rather than being completely open in their interior.

Several advantages are realized through the present invention. The cover is easier to manufacture and to install than prior-art covers. By using an outer frame that attaches to the upper portion of the bed, the floor space is not reduced after installation. The ability to open the inner frames to a completely vertical position allows for the full use of the floor space of the bed when transporting tall items. The covers can slide relative to the inner frames, allowing the cover panels to be moved into several configurations, for example, to provide horizontal work surfaces or a cover spaced above the bed.

While the invention has been shown in only some of its forms, it is not thus limited but is susceptible to various changes and modifications without departing from the spirit thereof. For example, the cover panels may be hingedly connected to the inner frames at their forward edges.

We claim:

1. A cargo bed cover, comprising:
   a generally planar outer frame having a pair of lateral sides and being adapted to be mounted to a cargo bed;
   two generally planar inner frames, each inner frame being pivotally connected to a lateral side of the outer frame for pivoting about a longitudinal axis relative to the outer frame between a closed position, in which the inner frame is generally parallel to the outer frame, and an open position, in which the liner frame is at an angle relative to the outer frame; and
   two generally planar cover panels, each cover panel being pivotally connected to one of the inner frames for pivoting about a longitudinal axis relative to the corresponding inner frame between a closed position, in which the cover panel is generally parallel to the corresponding inner frame, and an open position, in which the cover panel is at an angle relative to the corresponding inner frame, each cover panel also being slidingly connected to the corresponding inner frame for sliding relative to the corresponding inner frame; and wherein
   the cover panels are adapted to enclose the cargo bed when the inner frames and cover panels are in the closed positions, inner edges of the cover panels abutting each other to form a cover surface adjacent the outer frame.

2. The cargo bed cover of claim 1, wherein:
   each inner frame is connected to the outer frame with a hinge located at a laterally outward portion of the inner frame; and
   each cover panel is connected to the inner frame with a hinge located at a laterally inward portion of the liner frame.

3. The cargo bed cover of claim 1, further comprising:
   mounting inserts extending from the outer frame and adapted to engage the cargo bed.

4. The cargo bed cover of claim 1, wherein:
   the angle of each inner frame relative to the outer frame in the open position is approximately ninety degrees.

5. The cargo bed cover of claim 1, further comprising:
   a slot in each inner frame, the slot having a first section extending in a direction approximately parallel to the plane of the inner frame, the slot having a second section extending from the first section in a direction normal to the plane of the inner frame and having an open end; and
   a pin extending from each cover panel for engaging the slot of one of the inner frames for securing each cover panel in the closed position.

6. The cargo bed cover of claim 1, wherein:
   with the inner frames in the open position, the cover panels may slide toward each other to a position with their inner edges abutting each other, thereby forming the cover surface in a location spaced from the outer frame.

7. The cargo bed cover of claim 1, further comprising:

lift-assist devices connected between the inner frames and the corresponding cover panels and lift-assist devices connected between the inner frames and the outer frame.

8. The cargo bed cover of claim 1, wherein:

the lift-assist devices are gas-charged struts.

9. A cover for a pickup truck having a flat cargo bed with upright side walls, comprising:

a pair of outer frame members adapted to be mounted to upper edges of the side walls of the cargo bed;

two generally planar frames, each frame having an outer edge pivotally connected to one of the outer frame members for pivoting relative to the corresponding outer frame members between a closed position, in which the frames are in a single plane, and an open position, in which the frames are inclined relative to each other; and two generally planar cover panels, each cover panel being pivotally connected to one of the frames for pivoting relative to the corresponding frame between a closed position, in which each of the cover panels is generally parallel to and overlying the corresponding frame, and an open position, in which each of the cover panels is at an inclined angle relative to the corresponding frame;

the cover panels having inner and outer edges and being laterally slidable along the corresponding frames between all inner and outer positions relative to the frames; and the cover panels are adapted to enclose the cargo bed when the frames are in the closed position and the cover panels are in the inner and closed positions.

10. The cover of claim 9, wherein:

each cover panel is connected to one of the frames with a hinge located at an inner edge of the corresponding frame.

11. The cover of claim 9, further comprising:

mounting inserts extending from the outer frame members and adapted to engage the cargo bed.

12. The cover of claim 9, wherein:

each frame pivots approximately ninety degrees relative to the corresponding outer frame member.

13. The cover of claim 9, further comprising:

a slot in each frame, the slot having a first section extending in a direction approximately parallel to the plain of the frame, the slot having a second section extending from the first section in a direction normal to the plane of the frame and having an open end; and a pin extending from each cover panel for engaging the first section of the slot of one of the frames for securing the corresponding cover panel in the closed position, the pin being removable from the slot via the second section for pivoting the corresponding cover panel relative to the frame.

14. The cover of claim 9, wherein:

with the frames in the open position spaced parallel to each other in separate planes, the cover panels may slide toward each other to a position with their inner edges abutting each other to form a cover surface in a location spaced above the upper edges of the side walls of the cargo bed.

15. The cover of claim 9, further comprising:

lift-assist devices connected between the frames and the corresponding cover panels and lift-assist devices connected between the frames and the outer frame members.

16. A method of covering a flat cargo bed of a pickup, the cargo bed having upright side walls, the method comprising:

(a) pivotally mounting a planar frame to an upper edge of each of the side walls, each of the frames having an outer edge;

(b) pivotally mounting a planar cover panel to each of the frames;

(c) to enclose the cargo bed, pivoting the frames into a closed position within a single piano spaced above the cargo bed substantially at the level of the upper edges of the side walls and pivoting the cover panels relative to the frames to a closed position parallel with and overlying the frames;

(d) to open access to the cargo bed from the closed position, pivoting at least one of the cover panels at an inclined angle relative to the corresponding frame; and (e) to lengthen an effective height of the cargo bed from the closed position, pivoting both of the frames to an upright position relative to the sidewalls while the cover panels are parallel to and alongside the frames.

17. The method of claim 16, wherein step (b) comprises mounting an inner edge of each of the cover panels to one of the frames; and step (d) comprises lifting an outer edge of said at least one of the cover panels relative to the corresponding frame.

18. The method of claim 16, further comprising positioning an inner edge of at least one of the cover panels adjacent the outer edge of the corresponding frame and supporting said at least one of the cover panels in a horizontal position.

19. The method of claim 16, further comprising to form a canopy over the cargo bed from the closed position, pivoting both of the frames to an upright position relative to the side walls, pivoting the cover panels to horizontal positions, and sliding the cover panels toward each other until inner edges of the cover panels abut each other.

20. The method of claim 16, wherein step (c) farther comprises sliding the cover panels inwardly relative to the frames until inner edges of the cover panels abut each other.

\* \* \* \* \*